(12) United States Patent
Lee et al.

(10) Patent No.: US 12,552,461 B2
(45) Date of Patent: Feb. 17, 2026

(54) ROOF REINFORCEMENT STRUCTURE FOR VEHICLE

(71) Applicants: Hyundai Motor Company, Seoul (KR); Kia Corporation, Seoul (KR)

(72) Inventors: HaeHoon Lee, Seoul (KR); ChangHak Kang, Hwaseong-si (KR); Sang Kyoung Han, Gunpo-si (KR); Youngrock Kim, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 442 days.

(21) Appl. No.: 18/351,934

(22) Filed: Jul. 13, 2023

(65) Prior Publication Data
US 2024/0140536 A1    May 2, 2024

(30) Foreign Application Priority Data
Oct. 28, 2022  (KR) .......................... 10-2022-0141168

(51) Int. Cl.
| | |
|---|---|
| B62D 25/02 | (2006.01) |
| B62D 25/04 | (2006.01) |
| B62D 25/06 | (2006.01) |
| B62D 27/02 | (2006.01) |

(52) U.S. Cl.
CPC ............. *B62D 25/02* (2013.01); *B62D 25/04* (2013.01); *B62D 25/06* (2013.01); *B62D 27/023* (2013.01)

(58) Field of Classification Search
CPC ........ B62D 25/04; B62D 25/06; B62D 25/02; B62D 27/023; B60Y 2306/01
USPC ...... 296/203.01–203.04, 210, 29, 30, 193.06
See application file for complete search history.

(56) References Cited

U.S. PATENT DOCUMENTS

| | | | | |
|---|---|---|---|---|
| 4,252,364 | A * | 2/1981 | Toyama ............... | B62D 25/025 |
| | | | | 296/203.01 |
| 6,485,089 | B2 * | 11/2002 | Hanyu .................. | B62D 21/15 |
| | | | | 296/210 |
| 6,679,543 | B2 * | 1/2004 | Messano .................. | B60P 3/34 |
| | | | | 296/210 |
| 11,214,312 | B2 * | 1/2022 | Hattori ................... | B62D 25/04 |
| 11,383,771 | B1 * | 7/2022 | Newcomb .............. | B62D 25/06 |
| 11,772,708 | B2 * | 10/2023 | Song ..................... | B62D 21/152 |
| | | | | 296/187.09 |

* cited by examiner

*Primary Examiner* — Dennis H Pedder
(74) *Attorney, Agent, or Firm* — Slater Matsil, LLP (57) ABSTRACT

An embodiment roof reinforcement structure for a vehicle includes side body structures disposed on both sides of a vehicle body along a front to rear direction of the vehicle body, each of the side body structures including front and rear quarter completements at a front and a rear of the vehicle body, respectively, and a roof side inner member and a roof side panel connecting the front and rear quarter completements, a roof side inner bracket connected to the roof side inner member, a roof side outer assembly connected to the roof side inner bracket, and a roof side outer reinforcement member connected to the roof side inner bracket, the roof side outer assembly, and at least one of the front or the rear quarter completement on one of the sides of the vehicle body.

20 Claims, 10 Drawing Sheets

ROOF REINFORCEMENT STRUCTURE FOR VEHICLE

CROSS-REFERENCE TO RELATED APPLICATIONS

This application claims the benefit of Korean Patent Application No. 10-2022-0141168, filed on Oct. 28, 2022, which application is hereby incorporated herein by reference.

TECHNICAL FIELD

The present invention relates to a vehicle body.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

The PBV is an electric vehicle (EV)-based environment-friendly vehicle that provides various customized services to users. These PBVs can provide various customized services to users while moving from a starting point to a destination in an unmanned autonomous driving method. The PBV can be configured in various forms depending on the type of customized service.

For this purpose, the PBV is manufactured in a one box design with a large interior space. In another example, a PBV may have a roof panel of a large area applied to a roof structure of a vehicle body in order to provide a user with a wide indoor space. In another example, in a PBV, roof glass may be applied to a roof structure of a vehicle body in order to provide a user with an open feeling of an indoor space.

Therefore, the vehicle body of such a PBV should have a characteristic capable of securing the strength of the roof structure while enhancing the cross-section connectivity and bonding strength of the roof structure.

Matters described in this background section are prepared to enhance understanding of the background of embodiments of the invention and may include matters other than conventional art already known to a person of an ordinary skill in the field to which this art belongs.

SUMMARY

The present invention relates to a vehicle body. Particular embodiments relate to a roof reinforcement structure of a vehicle body applied to a PBV.

Embodiments of the present disclosure provide a roof reinforcement structure of a vehicle capable of enhancing cross-section connectivity and bonding strength of a roof structure.

A roof reinforcement structure for a vehicle according to an exemplary embodiment of the present invention may include side body structures disposed on both sides of a vehicle body along a front to rear direction of the vehicle body, the side body structures including quarter completements provided at the front and rear of the vehicle body, respectively, and a roof side inner member and a roof side panel connecting the front and rear quarter completements, a roof side inner bracket connected to the roof side inner member, a roof side outer assembly connected to the roof side inner bracket, and a roof side outer reinforcement member connected to the roof side inner bracket, the roof side outer assembly, and at least one of the quarter completements.

The roof side outer assembly may include a roof side outer lower member connected to an upper portion of the roof side inner bracket and a roof side outer upper member connected to an upper portion of the roof side outer lower member.

The roof side outer assembly may further include at least one bulk head connected to the upper portion of the roof side outer lower member and the lower portion of the roof side outer upper member.

The roof side outer reinforcement member may be connected to the rear portion of the roof side inner bracket and the rear portion of the roof side outer assembly and is connected to the rear quarter completement.

The roof side outer reinforcement member may include at least one convex forming portion formed along the vehicle body front to rear direction and a pair of concave forming portions formed to be spaced apart along the vehicle body front to rear direction in the at least one convex forming portion.

The pair of concave forming portions may form a pair of first closed cross-section areas connecting the roof side inner bracket, the roof side outer assembly, and the upper portion of the quarter outer panel of the at least one quarter completement in the vehicle body front to rear direction.

The lower portion of the pair of concave forming portions may be connected to a roof rail mounting portion formed on the upper portion of the quarter inner panel of the rear quarter completement.

The roof reinforcement structure for a vehicle according to an exemplary embodiment of the present invention may further include a roof rail assembly connected along the vehicle width direction to the roof rail mounting portion formed on the upper portion of the quarter inner panel of the quarter completement.

The roof rail assembly may include a roof rail lower member connected to the roof rail mounting portion and a roof rail upper member connected to an upper portion of the roof rail lower member.

The roof side inner bracket, the roof side outer assembly, and the roof side outer reinforcement member may connect the upper portion of the quarter outer panel of the rear quarter completement, the roof rail mounting portion, the roof rail lower member, and the roof rail upper member and may form a pair of second closed cross-section areas along the vehicle width direction.

The roof side outer reinforcement member may include the pair of concave forming portions formed to be spaced apart along the vehicle body front to rear direction, and the pair of concave forming portions may connect the roof side inner bracket, the roof side outer lower member, the roof side outer upper member, and an upper portion of the quarter outer panel of the rear quarter completement, and the pair of concave forming portions may form the pair of first closed cross-section areas along the front to rear direction of the vehicle body.

The pair of first closed cross-section areas and the pair of second closed cross-section areas may be disposed in cross direction.

A third closed cross-section area may be formed between the roof side inner bracket and the roof side outer upper member.

A fourth closed cross-section area may be formed between the roof side outer lower member and the roof side outer upper member.

The roof side inner bracket may be connected to the upper and lower portions of the roof side inner member through an upper flange and a lower flange to close at least one hole formed in the roof side inner member.

The roof reinforcement structure for a vehicle according to an exemplary embodiment of the present invention may further include a pillar reinforcement member connected to the roof side inner bracket, the roof side outer assembly, and the roof side outer reinforcement member in a vertical direction.

According to the exemplary embodiments of the present invention, it is possible to secure the roof strength of the roof structure body while enhancing the cross-section connectivity and bonding strength of the roof structure body. In addition, according to the exemplary embodiments of the present invention, connectivity, strength, durability, impact absorption, and NVH performance of a vehicle body with a one box design can be improved.

In addition, effects that can be obtained or predicted by an exemplary embodiment should be directly or implicitly disclosed in the detailed description of an exemplary embodiment. That is, various effects predicted according to an exemplary embodiment will be disclosed within a detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

The drawings referenced above are not necessarily drawn to scale, but should be understood as presenting rather simplified representations of various preferred features illustrating the basic principles of embodiments of the present invention. For example, specific design features of embodiments of the present invention, including specific dimensions, direction, position, and shape, will be determined in part by specific intended applications and use environments.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only, and is not intended to limit the embodiments of the present disclosure. As used herein, the singular forms are intended to include the plural forms as well, unless the context clearly indicates otherwise.

The terms "comprises" and/or "comprising" as used herein indicate the presence of specified features, integers, steps, operations, elements and/or components, but it should be understood that it does not exclude the presence or addition of one or more other features, integers, steps, operations, elements, components, and/or groups thereof.

As used in this specification, the term "and/or" includes any one or all combinations of at least one of the associated listed items.

In this specification, the term "connected" indicates that a physical relationship between two components, for example, in which components are directly connected to each other by welding, self piercing rivet (SPR), flow drill screw (FDS), structural adhesive, or the like, or in which components are indirectly connected through one or more intermediate components.

As used herein, "vehicle," "vehicular," "automotive" or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs, hydrogen-powered vehicles, and other alternative fuel vehicles (e.g., other than petroleum fuel derived from resources).

Hereinafter, embodiments of the present invention will be described in detail with reference to the accompanying drawings.

Figure 1:
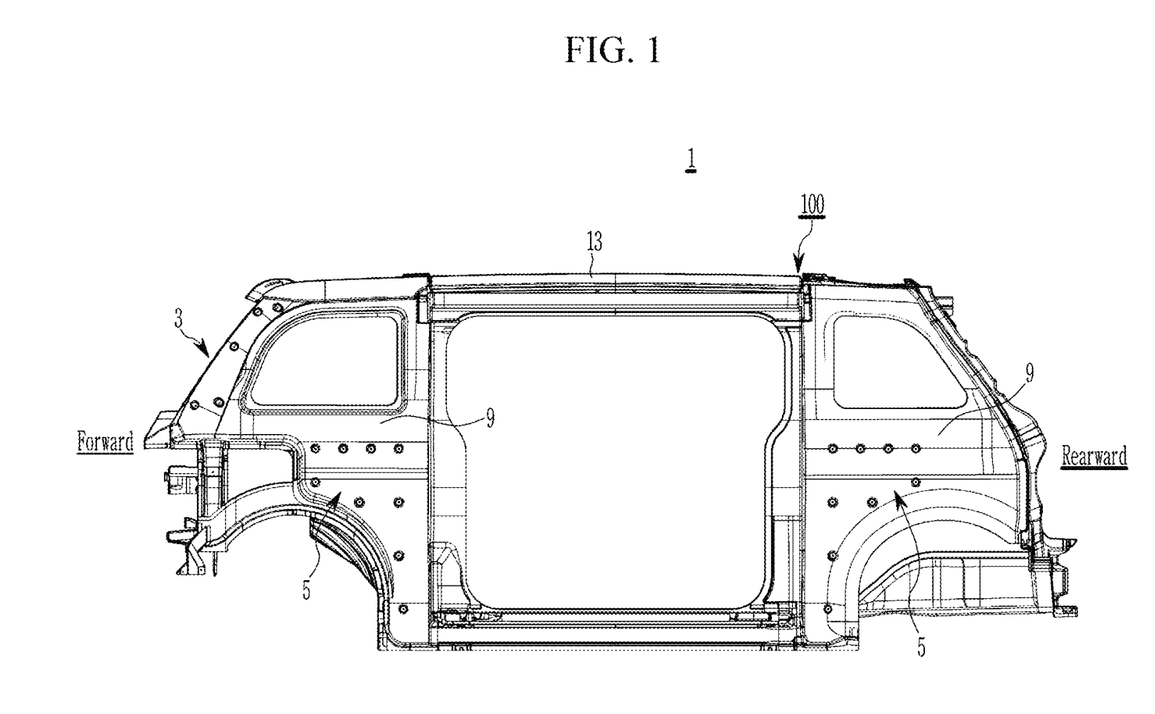
FIG. 1 is a side view illustrating a vehicle body to which a roof reinforcement structure of a vehicle body according to an exemplary embodiment of the present invention is applied.
Figure 2:
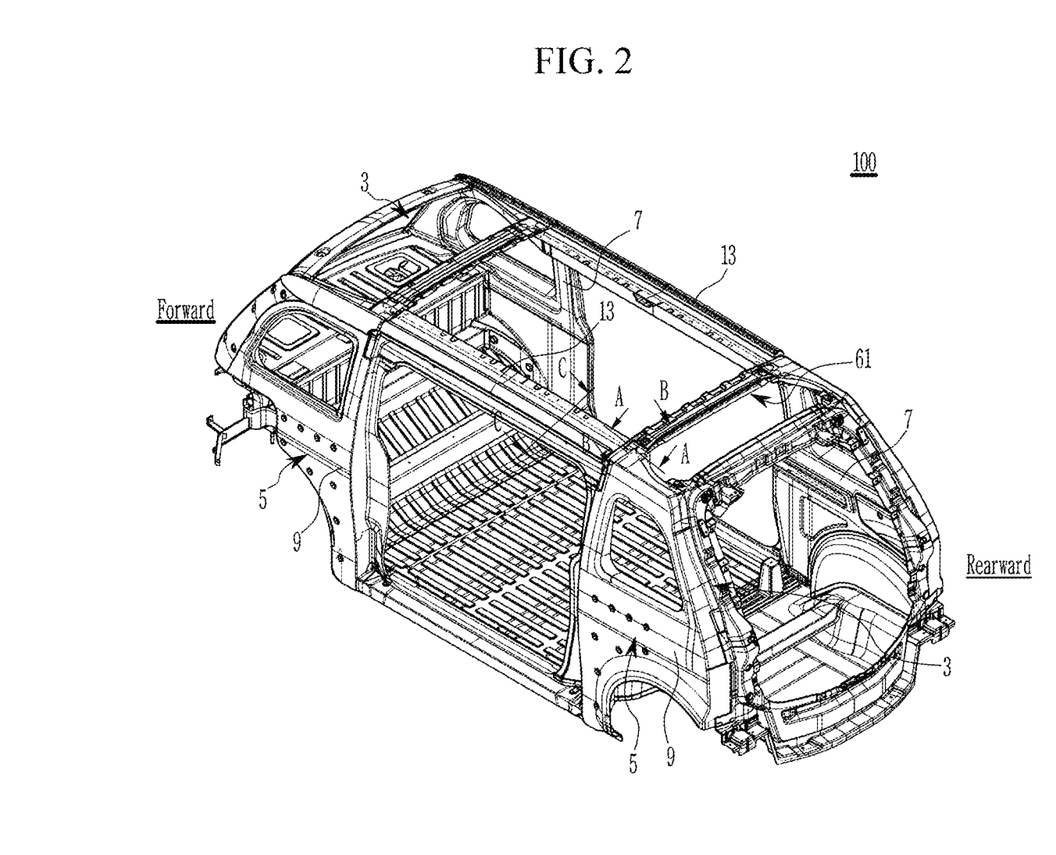
FIG. 2 is a perspective view of a vehicle body to which a roof reinforcement structure of a vehicle body according to an exemplary embodiment of the present invention is applied.
Figure 3:
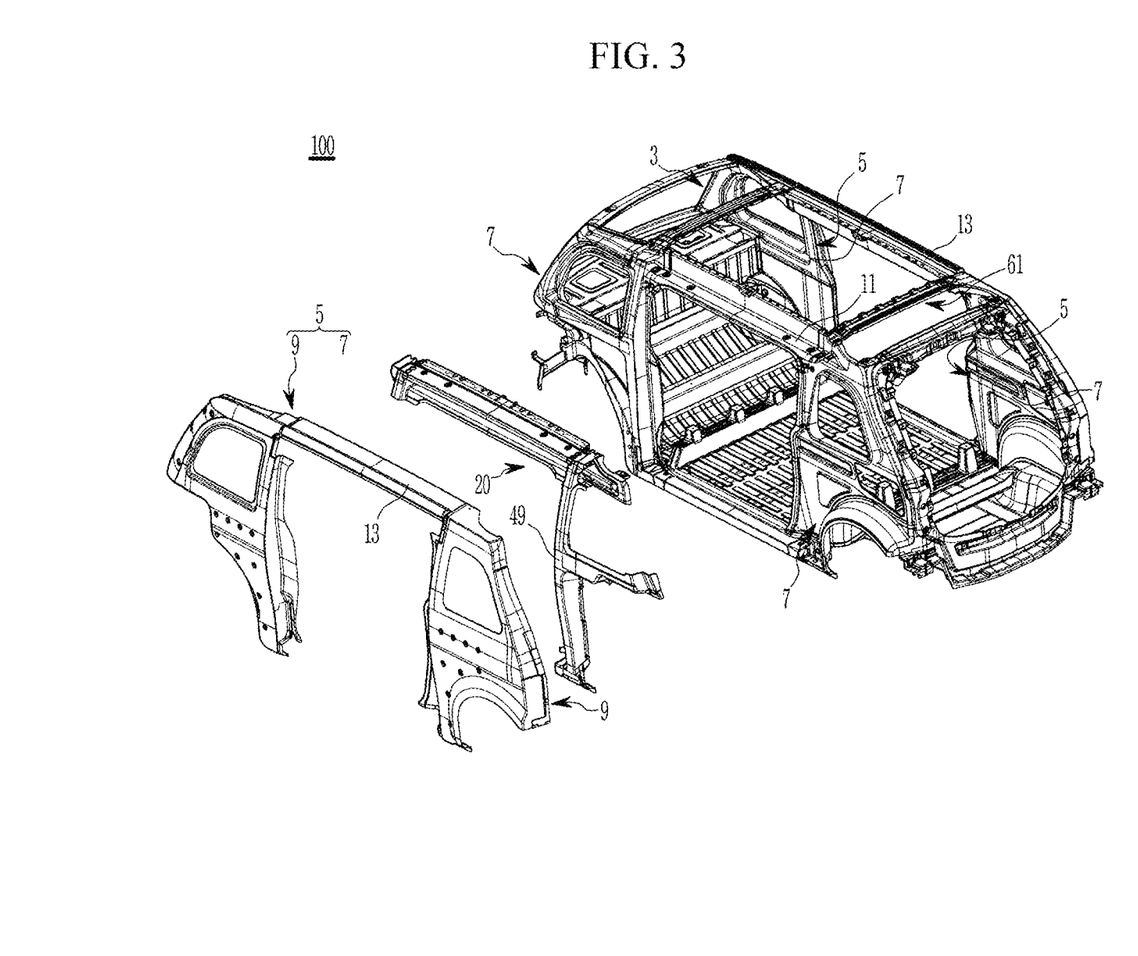
FIG. 3 is an exploded perspective view of a roof reinforcement structure of a vehicle body according to an exemplary embodiment of the present invention.

FIG. 1 is a side view illustrating a vehicle body to which a roof reinforcement structure of a vehicle body according to an exemplary embodiment of the present invention is applied, FIG. 2 is a perspective view of a vehicle body to which a roof reinforcement structure of a vehicle body according to an exemplary embodiment of the present invention is applied, and FIG. 3 is an exploded perspective view of a roof reinforcement structure of a vehicle body according to an embodiment of the present invention.

Referring to FIG. 1 to FIG. 3, a roof reinforcement structure 100 of a vehicle body according to an exemplary embodiment may be applied to, for example, a vehicle body of a purpose-based mobility vehicle (hereinafter referred to as a "PBV").

In one example, the PBV may be used as an electric vehicle-based life module vehicle that provides various services to occupants while moving from one place to a destination in an unmanned self-driving manner. The life module vehicle described above is also referred to as a "robo taxi," a "robo shuttle," or a "hailing vehicle" by a person of ordinary skill in the art.

Such a PBV may be manufactured in a one box design with a large interior space. In addition, the PBV may apply a facing type seat to provide a wide interior space.

The vehicle body of the PBV includes a skateboard type under body (not shown) (commonly referred to as a "rolling chassis" or "chassis frame" by those skilled in the art) and an upper body 1 assembled to the under body.

The under body may be equipped with a battery assembly (not shown) and a drive motor (not shown). And, the upper body 1 is a body in white (BIW) body coupled to the under body and may constitute a cabin with a wide indoor space.

In this specification, the "front to rear direction of the vehicle body" may be defined as the longitudinal direction of the vehicle body, the "vehicle width direction" may be defined as the left-right direction of the vehicle body, and the "up-and-down direction" may be defined as the height direction of the vehicle body.

Furthermore, in this specification, "upper end," "upper portion," or "upper surface," of a component indicates an end, portion, or surface of a component that is relatively upper in the drawing, and "lower end," "lower portion," or "lower surface" of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion) or other (another) end portion, etc.) denotes a portion of a component that includes that end.

As described above, the upper body 1 includes side body structures 3 disposed on both sides of the vehicle body along the front to rear direction of the vehicle body.

The side body structure 3 includes a quarter completement 5 provided at the front and rear of the vehicle body, respectively. The front and rear quarter completements 5 may be connected along the front to rear direction of the vehicle body through a roof side inner member 11 and a roof side panel 13. The roof side inner member 11 and the roof side panel 13 may be configured as a roof structure body that connects the front and rear quarter completements 5 along the front to rear direction of the vehicle body.

Each of the front and rear quarter completements 5 includes a quarter inner panel 7 and a quarter outer panel 9 connected along the vehicle width direction.

The roof side inner member 11 is connected to the front and rear quarter inner panels 7 respectively along the front to rear direction of the vehicle body. The roof side panel 13 is connected to the front and rear quarter outer panels 9 respectively along the front to rear direction of the vehicle body.

The roof reinforcement structure 100 of the vehicle body according to an exemplary embodiment has a structure capable of securing the roof strength of the roof structure body while reinforcing the cross-section connectivity and bonding strength of the roof structure body.

To this end, the roof reinforcement structure 100 of the vehicle body according to an exemplary embodiment includes a roof side reinforcement unit 20 configured to reinforce the bonding strength and strength of the roof structure body.

In an exemplary embodiment, the roof side reinforcement unit 20 is connected to the front and rear quarter completements 5 and may be connected to the roof side inner member 11 and the roof side panel 13.

Figure 4:
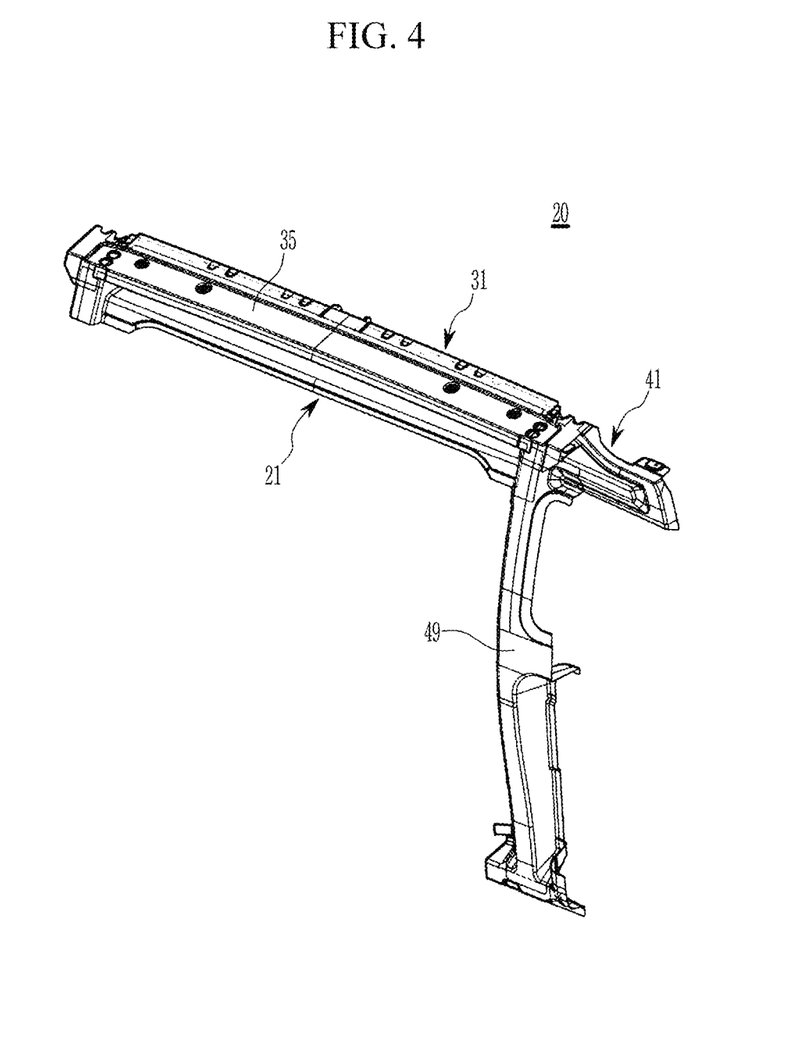
FIG. 4 is a perspective view of a roof side reinforcement unit applied to a roof reinforcement structure of a vehicle body according to an exemplary embodiment of the present invention.
Figure 5:
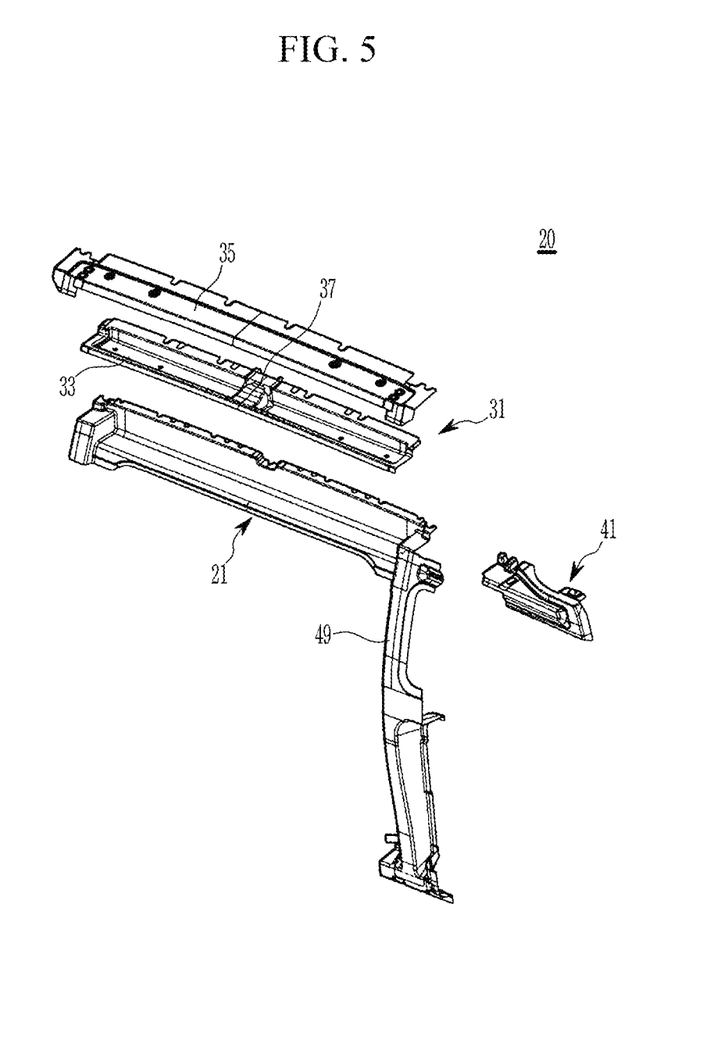
FIG. 5 is an exploded perspective view of a roof side reinforcement unit applied to a roof reinforcement structure of a vehicle body according to an exemplary embodiment of the present invention.

FIG. 4 is a perspective view of a roof side reinforcement unit applied to a roof reinforcement structure of a vehicle body according to an exemplary embodiment of the present invention, and FIG. 5 is an exploded perspective view of a roof side reinforcement unit applied to a roof reinforcement structure of a vehicle body according to an exemplary embodiment of the present invention.

Referring to FIG. 1 to FIG. 5, the roof side reinforcement unit 20 according to an exemplary embodiment includes a roof side inner bracket 21, a roof side outer assembly 31, and a roof side outer reinforcement member 41.

The roof side inner bracket 21 is connected to an upper portion of the roof side inner member 11. The roof side inner bracket 21 is connected to the front and rear quarter completements 5. The roof side inner bracket 21 may be formed in an "L" cross-section shape (see FIG. 8) in one example.

The roof side outer assembly 31 is connected to an upper portion of the roof side inner bracket 21. The roof side outer assembly 31 is connected to the front and rear quarter completements 5 respectively.

The roof side outer assembly 31 includes a roof side outer lower member 33 and a roof side outer upper member 35.

The roof side outer lower member 33 is connected to the upper portion of the roof side inner bracket 21. In one example, the roof side outer lower member 33 may be formed into a shape formed concave downward from its lower portion (see FIG. 9).

The roof side outer upper member 35 is connected to an upper portion of the roof side outer lower member 33. In one example, the roof side outer upper member 35 may have a shape in which one edge portion (e.g., an outer edge portion corresponding to both sides of the vehicle body) along the vehicle body front to rear direction is bent downward (see FIG. 9). The roof side outer upper member 35 is connected to a lower portion of the roof side panel 13.

The roof side outer assembly 31 further includes at least one bulk head 37. The at least one bulk head 37 is configured to reinforce the strength of the roof side outer assembly 31.

The at least one bulk head 37 may be disposed between the roof side outer lower member 33 and the roof side outer upper member 35 near the center of the roof side outer assembly 31. The at least one bulk head 37 is connected to the upper portion of the roof side outer lower member 33 and the lower portion of the roof side outer upper member 35.

The roof side outer reinforcement member 41 reinforces the strength of the roof side inner bracket 21 and the roof side outer assembly 31.

The roof side outer reinforcement member 41 may be connected to the roof side inner bracket 21, the roof side outer assembly 31, and at least one quarter completement 5.

Here, the at least one quarter completement 5 may be the rear quarter completement 5. That is, the roof side outer reinforcement member 41 is connected to the rear portion of the roof side inner bracket 21 and the rear portion of the roof side outer assembly 31 and may be connected to the rear quarter completement 5.

Figure 6A:
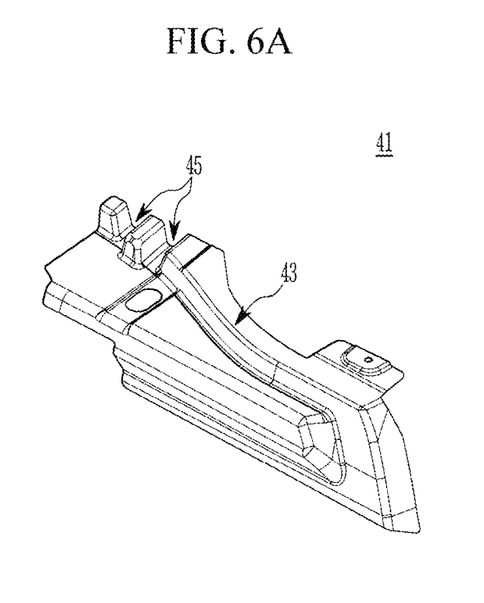
FIG. 6A and FIG. 6B are perspective views of a roof side outer reinforcement member of a roof side reinforcement unit applied to a roof reinforcement structure of the vehicle body according to an exemplary embodiment of the present invention.
Figure 6B:
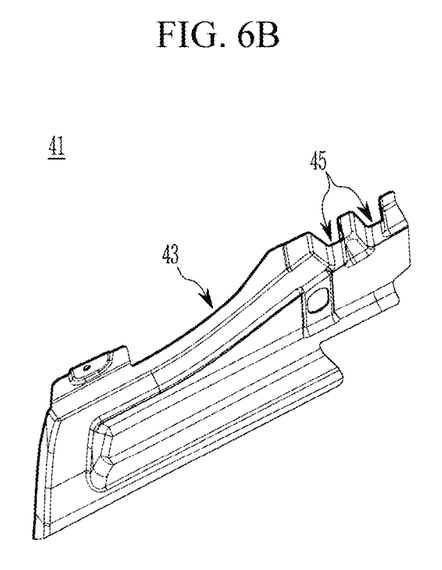

FIG. 6A and FIG. 6B are perspective views of a roof side outer reinforcement member of a roof side reinforcement unit applied to a roof reinforcement structure of the vehicle body according to an exemplary embodiment of the present invention.

The roof side outer reinforcement member 41, as shown in FIG. 6A and FIG. 6B, includes at least one convex forming portion 43 and a pair of concave forming portions 45.

The at least one convex forming portion 43 is convex upward on one edge portion of the roof side outer reinforcement member 41 along the vehicle body front to rear direction. The pair of concave forming portions 45 are formed concave downward from at least one convex forming portion 43 and are spaced apart along the vehicle body front to rear direction.

As shown in FIG. 3 to FIG. 5, 3 the roof side reinforcement unit 20 according to an exemplary embodiment further includes a pillar reinforcement member 49.

The pillar reinforcement member 49 is connected to the roof side inner bracket 21, the roof side outer assembly 31, and the roof side outer reinforcement member 41 in a vertical direction. The pillar reinforcement member 49 may be connected to the rear quarter completement 5.

Figure 7:
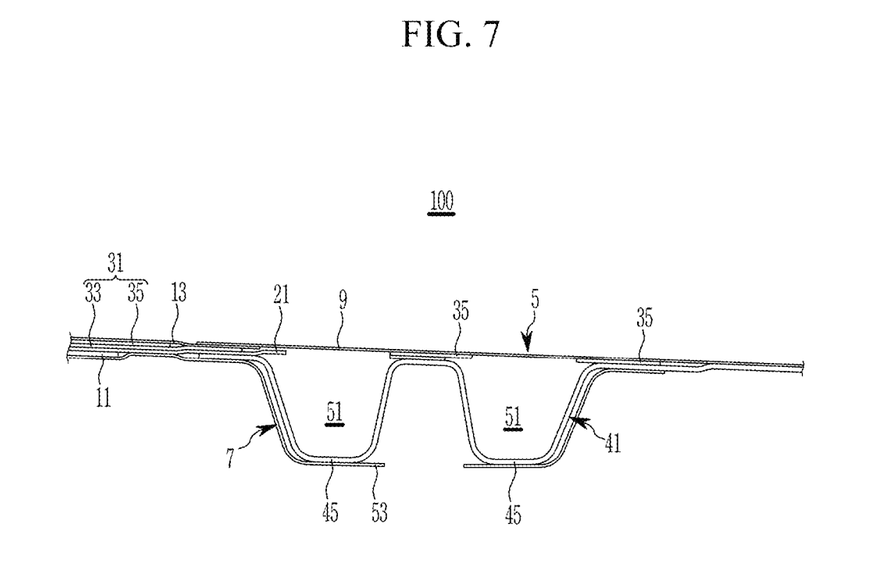
FIG. 7 is a cross-sectional view along line A-A in FIG. 2.
Figure 8:
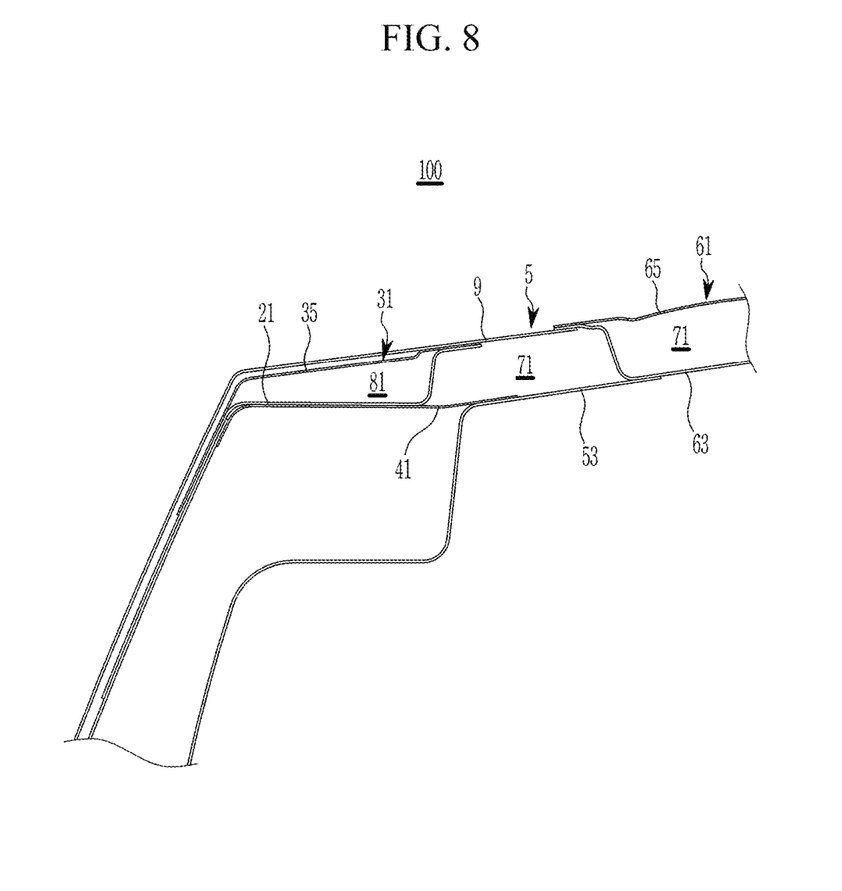
FIG. 8 is a cross-sectional view along line B-B in FIG. 2.
Figure 9:
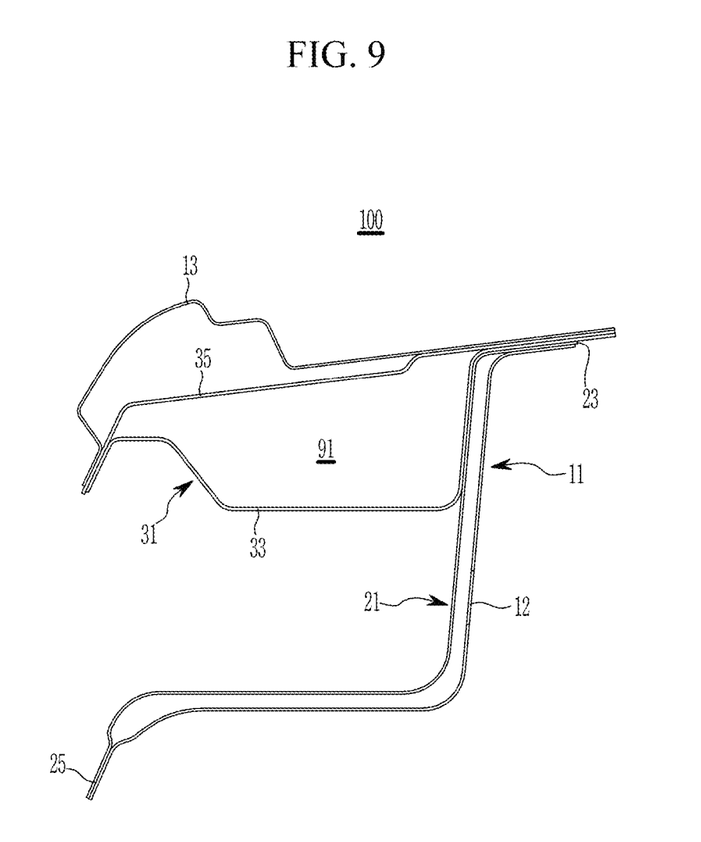
FIG. 9 is a cross-sectional view along line C-C in FIG. 2.

FIG. 7 is a cross-sectional view along line A-A in FIG. 2, FIG. 8 is a cross-sectional view along line B-B in FIG. 2, and FIG. 9 is a cross-sectional view along line C-C in FIG. 2.

Hereinafter, referring to FIG. 7 to FIG. 9, the roof reinforcement structure 100 of the vehicle body according to an exemplary embodiment to which the roof side reinforcement unit 20 described above is applied will be described in more detail.

Referring to FIG. 7, the vehicle body roof reinforcement structure 100 according to an exemplary embodiment includes a pair of first closed cross-section areas 51 formed by the pair of concave forming portions 45 of a roof side outer reinforcement member 41.

The pair of concave forming portions 45 connect the roof side inner bracket 21, the roof side outer lower member 33, the roof side outer upper member 35, and an upper portion of the quarter outer panel 9 of the rear quarter completement 5, and the pair of concave forming portions 45 may form the pair of first closed cross-section areas 51 along the front to rear direction of the vehicle body.

The lower portion of the pair of concave forming portions 45 may be connected to a roof rail mounting portion 53 formed on the upper portion of the quarter inner panel 7 of the rear quarter completement 5.

Referring to FIG. 8, the roof reinforcement structure 100 of the vehicle body according to an exemplary embodiment may include a roof rail assembly 61 connected to the roof rail mounting portion 53 along the vehicle width direction.

As shown in FIG. 2 and FIG. 3, the roof rail assembly 61 may be disposed on the rear side of the roof structure body. The roof rail assembly 61 includes a roof rail lower member 63 and a roof rail upper member 65 connected to each other along a vertical direction.

The roof rail lower member 63 is connected to an upper portion of the roof rail mounting portion 53. In one example, the roof rail lower member 63 may be formed by being concave downward.

The roof rail upper member 65 is connected to an upper portion of the roof rail lower member 63. And, the roof rail upper member 65 is connected to the roof side panel 13 (see FIG. 2 and FIG. 3).

The roof rail lower member 63 and the roof rail upper member 65 connected to each other along the vertical direction may form a closed cross-section.

The roof reinforcement structure 100 of the vehicle body according to an exemplary embodiment may include pair of second closed cross-section areas 71 formed by the roof side inner bracket 21, the roof side outer upper member 35, the roof side outer reinforcement member 41, and the roof rail assembly 61 of the roof side outer assembly 31.

The roof side inner bracket 21, the roof side outer upper member 35, and the roof side outer reinforcement member 41 connect the upper portion of the quarter outer panel 9 of the rear quarter completement 5, the roof rail mounting portion 53, the roof rail lower member 63, and the roof rail upper member 65 and form the pair of second closed cross-section areas 71 along the vehicle width direction.

The pair of first closed cross-section areas 51 as shown in FIG. 7 and the pair of second closed cross-section areas 71 as shown in FIG. 8 may be disposed in a cross direction (e.g., the vehicle body front and rear direction and the vehicle width direction).

The roof reinforcement structure 100 of the vehicle body according to the exemplary embodiment of the present invention, as shown in FIG. 8, further includes a third closed cross-section area 81 formed by the roof side inner bracket 21 and the roof side outer upper member 35.

The third closed cross-section area 81 is formed between the roof side inner bracket 21 and the roof side outer upper member 35 and may be disposed along the vehicle width direction along with the pair of second closed cross-section areas 71.

The roof reinforcement structure 100 of the vehicle body according to the exemplary embodiment of the present invention, as shown in FIG. 9, further includes a fourth closed cross-section area 91 formed by the roof side outer assembly 31 along the vehicle body front and rear direction.

The fourth closed cross-section area 91 is formed between the roof side outer lower member 33 and the roof side outer upper member 35 of the roof side outer assembly 31.

The roof side inner bracket 21 is connected to the upper and lower portions of the roof side inner member 11 to close at least one hole 12 formed in the roof side inner member 11.

The roof side inner bracket 21 may be connected to the upper and lower portions of the roof side inner member 11 through an upper flange 23 formed on the upper portion and a lower flange 25 formed on the lower portion.

Hereinafter, the assembly process of the roof reinforcement structure 100 of the vehicle body according to an exemplary embodiment is explained. The front and rear quarter inner panels 7 connected along the vehicle body front to rear direction by the roof side inner members 11 are provided. And, the front and rear quarter outer panels 9 connected along the front to rear direction by the roof side panel 13 are provided.

In an exemplary embodiment, the roof side reinforcement unit 20 connecting the roof side inner bracket 21, the roof side outer assembly 31, the roof side outer reinforcement member 41, and the pillar reinforcement member 49 is provided.

In an exemplary embodiment, the roof rail assembly 61 connecting the roof rail lower member 63 and the roof rail upper member 65 along a vertical direction is provided.

In this state, the roof side reinforcement unit 20 is connected to the front and rear quarter inner panel 7 and the roof side inner member 11. Then, the front and rear quarter outer panels 9 are connected to the front and rear quarter inner panels 7, and the roof side panel 13 is connected to the roof side reinforcement unit 20.

The roof rail assembly 61 is connected to the roof rail mounting portion 53 formed on the upper portion of the rear quarter inner panel 7 along the vehicle width direction.

The roof reinforcement structure 100 of the vehicle body according to an exemplary embodiment includes the roof side reinforcement unit 20 connected to the front and rear quarter completements 5 and connected to the roof side inner member 11 and the roof side panel 13.

In an exemplary embodiment, the roof side reinforcement unit 20 forms the pair of first closed cross-section areas 51 along the vehicle body front and rear direction at a portion connected to the roof rail assembly 61 and the pair of second closed cross-section areas 71 along the vehicle width direction.

The pair of first closed cross-section areas 51 and the pair of second closed cross-section areas 71 are disposed in the cross direction at the portion where the roof side reinforcement unit 20 and the roof rail assembly 61 are connected.

The roof reinforcement structure 100 of the vehicle body according to an exemplary embodiment may form the third closed cross-section area 81 disposed along the vehicle width direction along with the pair of second closed cross-section areas 71 by the roof side reinforcement unit 20.

The roof reinforcement structure 100 of the vehicle body according to an exemplary embodiment may form the fourth closed cross-section area 91 formed along the vehicle body front to rear direction by the roof side reinforcement unit 20.

Therefore, the roof reinforcement structure 100 of the vehicle body according to an exemplary embodiment may secure the roof strength of the roof structure body while strengthening the cross-section connectivity and coupling strength of the roof structure body on which various roof modules (not shown) are mounted.

The roof reinforcement structure 100 of the vehicle body according to an exemplary embodiment may secure waterproofness of the vehicle body by closing at least one hole 12 formed in the roof side inner member 11 through the roof side inner bracket 21 of the roof side reinforcement unit 20.

While embodiments of this invention have been described in connection with what is presently considered to be practical exemplary embodiments, it is to be understood that the embodiments of the invention are not limited to the disclosed embodiments. On the contrary, the embodiments are intended to cover various modifications and equivalent arrangements included within the spirit and scope of the appended claims.

What is claimed is:

1. A roof reinforcement structure for a vehicle, the structure comprising:
    side body structures disposed on both sides of a vehicle body along a front to rear direction of the vehicle body, each of the side body structures comprising front and rear quarter completements at a front and a rear of the vehicle body, respectively, and a roof side inner member and a roof side panel connecting the front and rear quarter completements;
    a roof side inner bracket connected to the roof side inner member;
    a roof side outer assembly connected to the roof side inner bracket; and
    a roof side outer reinforcement member connected to the roof side inner bracket, the roof side outer assembly, and at least one of the front or the rear quarter completement on one of the sides of the vehicle body.

2. The structure of claim 1, wherein the roof side outer assembly comprises:
    a roof side outer lower member connected to an upper portion of the roof side inner bracket; and
    a roof side outer upper member connected to an upper portion of the roof side outer lower member.

3. The structure of claim 2, wherein the roof side outer assembly further comprises a bulk head connected to the upper portion of the roof side outer lower member and a lower portion of the roof side outer upper member.

4. The structure of claim 1, wherein the roof side outer reinforcement member is connected to a rear portion of the roof side inner bracket and a rear portion of the roof side outer assembly and is connected to the rear quarter completement on the one of the sides of the vehicle body.

5. The structure of claim 1, wherein the roof side inner bracket is connected to upper and lower portions of the roof side inner member through an upper flange and a lower flange, respectively, to close a hole in the roof side inner member.

6. The structure of claim 1, further comprising a pillar reinforcement member connected to the roof side inner bracket, the roof side outer assembly, and the roof side outer reinforcement member in a vertical direction.

7. A roof reinforcement structure for a vehicle, the structure comprising:
    side body structures disposed on both sides of a vehicle body along a front to rear direction of the vehicle body, each of the side body structures comprising front and rear quarter completements at a front and a rear of the vehicle body, respectively, and a roof side inner member and a roof side panel connecting the front and rear quarter completements;
    a roof side inner bracket connected to the roof side inner member;
    a roof side outer assembly connected to the roof side inner bracket; and
    a roof side outer reinforcement member connected to the roof side inner bracket, the roof side outer assembly, and at least one of the front or the rear quarter completement on one of the sides of the vehicle body, the roof side outer reinforcement member comprising:
        a convex forming portion disposed along the front to rear direction of the vehicle body; and
        a pair of concave forming portions spaced apart along the front to rear direction of the vehicle body in the convex forming portion.

8. The structure of claim 7, wherein the pair of concave forming portions define a pair of first closed cross-section areas connecting the roof side inner bracket, the roof side outer assembly, and an upper portion of a quarter outer panel of the at least one quarter completement in the front to rear direction of the vehicle body.

9. The structure of claim 8, wherein a lower portion of the pair of concave forming portions is connected to a roof rail mounting portion provided on an upper portion of a quarter inner panel of the rear quarter completement on the one of the sides of the vehicle body.

10. The structure of claim 9, further comprising a roof rail assembly connected along a vehicle width direction to the roof rail mounting portion provided on the upper portion of the quarter inner panel of the rear quarter completement on the one of the sides of the vehicle body.

11. The structure of claim 10, wherein the roof rail assembly comprises:
    a roof rail lower member connected to the roof rail mounting portion; and
    a roof rail upper member connected to an upper portion of the roof rail lower member.

12. The structure of claim 11, wherein the roof side inner bracket, the roof side outer assembly, and the roof side outer reinforcement member connect the upper portion of the quarter outer panel of the rear quarter completement on the one of the sides of the vehicle body, the roof rail mounting portion, the roof rail lower member, and the roof rail upper member and define a pair of second closed cross-section areas along the vehicle width direction.

13. The structure of claim 12, wherein:
the roof side outer reinforcement member comprises the pair of concave forming portions spaced apart along the front to rear direction of the vehicle body;
the pair of concave forming portions connect the roof side inner bracket, a roof side outer lower member, a roof side outer upper member, and the upper portion of the quarter outer panel of the rear quarter completement on the one of the sides of the vehicle body; and
the pair of concave forming portions define the pair of first closed cross-section areas along the front to rear direction of the vehicle body.

14. The structure of claim 13, wherein the pair of first closed cross-section areas and the pair of second closed cross-section areas are disposed in cross directions.

15. The structure of claim 14, wherein a third closed cross-section area is defined between the roof side inner bracket and the roof side outer upper member.

16. The structure of claim 15, wherein a fourth closed cross-section area is formed between the roof side outer lower member and the roof side outer upper member.

17. A vehicle comprising:
an under body; and
an upper body coupled to the under body, the upper body comprising:
side body structures disposed on both sides of the upper body along a front to rear direction of the vehicle, each of the side body structures comprising front and rear quarter completements at a front and a rear of the upper body, respectively, and a roof side inner member and a roof side panel connecting the front and rear quarter completements;
a roof side inner bracket connected to the roof side inner member;
a roof side outer assembly connected to the roof side inner bracket;
a roof side outer reinforcement member connected to the roof side inner bracket, the roof side outer assembly, and at least one of the front or the rear quarter completement on one of the sides of the upper body; and
a pillar reinforcement member connected to the roof side inner bracket, the roof side outer assembly, and the roof side outer reinforcement member in a vertical direction.

18. The vehicle of claim 17, wherein the roof side outer assembly comprises:
a roof side outer lower member connected to an upper portion of the roof side inner bracket;
a roof side outer upper member connected to an upper portion of the roof side outer lower member; and
a bulk head connected to the upper portion of the roof side outer lower member and a lower portion of the roof side outer upper member.

19. The vehicle of claim 17, wherein the roof side outer reinforcement member is connected to a rear portion of the roof side inner bracket and a rear portion of the roof side outer assembly and is connected to the rear quarter completement on the one of the sides of the upper body.

20. The vehicle of claim 17, wherein the roof side inner bracket is connected to upper and lower portions of the roof side inner member through an upper flange and a lower flange, respectively, to close a hole in the roof side inner member.

* * * * *